United States Patent [19]
Durst

[11] 3,906,057
[45] Sept. 16, 1975

[54] COMPATIBLE POLYMER ALLOYS

[75] Inventor: Richard R. Durst, Stow, Ohio

[73] Assignee: The General Tire & Rubber Company, Akron, Ohio

[22] Filed: Apr. 29, 1974

[21] Appl. No.: 464,903

Related U.S. Application Data

[63] Continuation-in-part of Ser. No. 282,484, Aug. 21, 1972, abandoned, which is a continuation-in-part of Ser. No. 207,612, Dec. 13, 1971, abandoned, which is a continuation-in-part of Ser. No. 5,369, Jan. 23, 1970, abandoned, which is a continuation-in-part of Ser. No. 803,049, Feb. 27, 1969, abandoned.

[52] U.S. Cl. ......... 260/876 B; 260/879; 260/880 B; 260/892; 260/894; 260/DIG. 32
[51] Int. Cl.$^2$ ............. C08L 53/02; C08L 25/06; C08L 25/10
[58] Field of Search ............ 260/876 R, 876 B

[56] References Cited
UNITED STATES PATENTS

| | | | |
|---|---|---|---|
| 3,265,765 | 8/1966 | Holden et al. | 260/876 B |
| 3,322,856 | 5/1967 | Holden et al. | 260/876 B |
| 3,476,829 | 11/1969 | Gruver et al. | 260/876 B |
| 3,781,383 | 12/1973 | Finestone et al. | 260/876 R |

FOREIGN PATENTS OR APPLICATIONS

| | | | |
|---|---|---|---|
| 1,053,596 | 1/1967 | United Kingdom | 260/876 B |
| 1,145,923 | 3/1969 | United Kingdom | 260/876 B |
| 6,603,376 | 9/1966 | Netherlands | 260/876 B |

Primary Examiner—Wilbert J. Briggs, Sr.

[57] ABSTRACT

This invention comprises blends of otherwise relatively imcompatible polymers, particularly vinyl aromatic polymers and conjugated aliphatic diene polymers, by the incorporation of graded ABA block copolymers, the A and B segments of which are compatible with the otherwise relatively incompatible polymers in the blend. Of particular importance is the embodiment comprising blends of styrene and butadiene polymers in molar ratios of from about 2:1 to about 5:1 with certain graded ABA styrene-butadiene block copolymers acting as surfactants thereby producing a novel class of resins having excellent impact strength, flexural modulus and heat distortion characteristics. The block copolymers have a weight ratio of A:B in the range of 45:55 to 60:40 and are present in an amount sufficient to give a total styrene content, both as homopolymer and copolymer, of about 75 to 95 weight percent based on the total resin in the blend. In the blends of this invention the discontinuous phase, made up of the diene polymers and the block copolymers, is present in the form of particles of which at least 70, preferably 85 or more, weight percent have particle diameter in the range of 0.2 to 5 microns as measured by the "Zeiss Particle Size Analyzer".

20 Claims, No Drawings

COMPATIBLE POLYMER ALLOYS

CROSS-REFERENCE TO RELATED APPLICATION

This application is a continuation-in-part of U.S. patent application Ser. No. 282,484, now abandoned filed Aug. 21, 1972 as a continuation-in-part of U.S. patent application Ser. No. 207,612, now abandoned, filed Dec. 13, 1971 as a continuation-in-part of U.S. patent application Ser. No. 5,369, now abandoned, filed Jan. 23, 1970 as a continuation-in-part of U.S. patent application Ser. No. 803,049, filed Feb. 27, 1969, now abandoned.

BACKGROUND OF THE INVENTION

Previous efforts to develop a specific group of physical properties in a particular type of polymeric product have shown that the best single properties appear to be promoted in homopolymers and that any attempt to generate a combination of optimum physical properties by the preparation of copolymers from monomers whose homopolymers have a certain desired physical property tend to result in copolymers having a compromise in physical properties. This has been found even with the preparation of block copolymers. Efforts to combine the best features of two or more polymers in blends have usually resulted in products exhibiting discontinuities in properties with change in proportions of the polymer ingredients, and in many cases the desirable properties of all of the polymer ingredients were lost, especially in blends of homopolymers. While these failures were first attributed to inadequate mixing procedures for dispersing one polymer in another, it now appears that such failures are due almost entirely to the inherent incompatibility of the polymers to be blended.

Incompatibility in polymer mixtures is sometimes necessary to develop desired physical properties in such mixtures. One of a number of instances of this phenomenon is the improvement of impact resistance of a composition based on a particular type of resinous homopolymer by adding a different incompatible polymer. Experimental research has shown that the two polymers must be incompatible in order to achieve the best result. In this case the term "incompatible" applies to materials a blend of which displays separately and distinctly the glass transition temperature (or second order transition temperature) characteristics of each of the incompatible materials in the blend.

Various combinations of resinous polymers and rubbery polymers have been tried in efforts to produce new materials having some combination of the desirable properties of the ingredients with a minimum of the undesirable properties of the ingredients. Among the combinations which have been tried have been combinations of styrene-type polymers and butadiene-type polymers, especially such combinations using high proportions of styrene polymers to product tough polystyrene molding compositions.

Block copolymers of the types AB, ABA, $(AB)_n$ and $(AB)_nA$ have been prepared, and in specific systems certain defined block copolymers have been used in combination with polymerized conjugated dienes, polymerized styrene-type monomers and combinations of the two polymers, sometimes with additional ingredients. In the parent applications reference has been made to U.S. Pat. Nos. 2,727,878 and 2,755,270 and United Kingdom Pat. No. 1,092,296. Other references which should be noted include U.S. Pat. Nos. 3,231,635; 3,251,905; 3,322,856; 3,377,404; 3,429,951; 3,441,530; 3,464,850 and 3,476,829; Japanese Pat. No. 27866/71; published Dutch Pat. application No. 03376/66 French Pat. No. 1,457,763; and United Kingdom Pat. Nos. 1,053,596; 1,120,404 and 1,145,923.

The subject application is directed particularly to three-component blends in which one component is a polystyrene, one component is a polybutadiene and one component is a graded ABA styrene-butadiene-styrene block copolymer. Of the references set forth above, the most pertinent to the subject matter of this application is U.S. Pat. No. 3,476,829 which shows a combination of 40 to 95, preferably 60 to 90, weight percent of polystyrene, 4.5 to 39.5, preferably 9 to 30, weight percent of a rubbery conjugated diene polymer and 0.5 to 25, preferably 1 to 20, weight percent of a solution polymerized block copolymer of indeterminant structure but containing 50 to 98, preferably 70 to 90, weight percent of polymerized styrene, the combination containing 5 to 40, preferably 8 to 35, weight percent of rubber both as homopolymer and copolymer. This reference teaches the necessity of a peroxide cure to achieve the desired properties, but there is a simple disclosure of such a combination which was momentarily free of peroxide in the course of preparation of a combination within the invention of the reference. No properties or utility are taught for the peroxide-free combination. There is no concern for particle size of the rubbery polymer nor is there any criticality taught as to the structure of the block copolymer. The copolymers specifically disclosed appear to be graded AB styrene-butadiene copolymers having styrene-butadiene weight ratios of 50:50, 75:25, 88:12 and 90:10.

The principal object of this invention is to provide a novel blend of incompatible polymers, preferably homopolymers, using a particular type of block copolymer as an alloying agent or polymer-polymer surfactant to bind the incompatible polymers together while maintaining a high degree of phase separation but forming a link between the two phases. Another object is to provide novel polystyrene compositions having good impact strengths together with a good balance of properties from room temperature to −40°F. compared to presently available polystyrene compositions. Another object is to provide such compositions which can be prepared by melt mixing under shear as well as by solution blending techniques without a loss in desired properties. These objects as well as others which are apparent from this description are accomplished by this invention.

SUMMARY OF THE INVENTION

This invention comprises blends of otherwise compatible polymers, particularly blends of homopolymers of a conjugated aliphatic hydrocarbon diene such as butadiene or isoprene as a discontinuous phase in a matrix of homopolymers of a monovinyl-substituted monocyclic aromatic hydrocarbon such as styrene. The discontinuous phase is rendered homogeneously dispersed in the matrix by the use of graded block copolymers of the general configuration ABA, wherein each A and B represent polymer segments compatible with the polymers to be blended. The block copolymers act as polymer-polymer surfactants in alloying otherwise highly incompatible polymers. For the styrene-butadiene type system the block copolymers ABA are such that each A represents a polymer segment which is compatible with the styrene-type polymer and B represents a polymer segment which is compatible with the diene-type polymer. These blends can be prepared satisfactorily by solution blending, mill mixing, high-shear blender mixing as in a Banbury blender or any continuous mixer with sufficient attention to thorough mixing of components.

The blends of this invention provide for improvement in some physical properties of the continuous polystyrene-type phase without a significant reduction in the other physical properties. However, this improvement in properties depends largely upon the particle size of the discontinuous phase made up of particles of the graded ABA block copolymer and the diene-type polymers. The most effective particles must each have a particle diameter in the range of 0.2 to 5 microns although particles outside this range have a still detectable effect. Consequently, at least 70 weight percent, preferably 85 or more weight percent, of the discontinuous phase must be present as particles with the defined particle size range. The physical state of the diene-type polymers and the graded ABA block copolymers prior to incorporation into the styrene-type polymer is only significant to the degree that it affects the particle size of the discontinuous phase in the finished blend, said size also being directly affected by the amount of shear on the system during blending.

The blends of this invention are particularly useful for high-impact polystyrene sheeting as used, for example, in refrigerator interiors and for injection molded parts, e.g., vacuum cleaner housings.

DESCRIPTION OF THE PREFERRED EMBODIMENTS

It has been found that high impact polystyrene with an excellent balance of properties is produced by blending polystyrenes and polydienes with graded ABA type block copolymers in which each A block is essentially polymerized styrene, the remainder of each such block being polymerized diene, and each B block is essentially polymerized diene, the remainder of said block being polymerized styrene, and the weight ratio of A to B ranges from 45:55 to 60:40.

Similar studies have been made on mixtures of polystyrene, polyisoprene and AB block copolymers of styrene and isoprene as reported in European Polymer Journal, 1668, Vol. 4, pp. 173–205, Pergamon Press (England). However, these studies indicated that the presence of the polyisoprene was not as significant as the presence of the block copolymer.

The styrene-type polymers (A) employed as matrices in the blends of this invention can be simple homopolymers of styrene or alpha-methyl styrene or similar vinyl aryl monomers or copolymers containing at least about 90 weight percent of such monomers, preferably monocyclic vinyl aryl monomers including at least 35 weight percent copolymerized styrene. The styrene-type polymers can also contain not over about 10 weight percent of other copolymerized ethylenically unsaturated compounds including mono-unsaturated compounds and conjugated di-unsaturated compounds such as acrylic compounds such as acrylic and methacrylic acid; esters, amides and nitriles on the order of methyl methacrylate, ethyl acrylate, methacrylamide, fumaronitrile and acrylonitrile; cyclic unsaturated compounds such as the nuclear chlorosytrene, vinyl naphthalene, vinyl carbazole and acenaphthylene; and conjugated unsaturates such as butadiene, isoprene, chloroprene, 2,3-dichlorobutadiene, piperylene and the like. In bulk polymerization these resins are commonly prepared by heating the sytrene and any comonomer at temperatures in the range of 100° to 200°C., with application of pressure if necessary to confine the monomers. The polymerization can also be carried out at lower temperatures by the addition of free-radical generating peroxidic catalysts such as benzoyl peroxide, acetyl peroxide, di-t-butyl peroxide and the like. The polymerization can also be carried out in suspension to yield a dry powder or in emulsion, usually resulting in a latex of polystyrene, which can be either coagulated to yield the solid powdery polystyrene or used as such for blending with one or both of the other constituents in the form of latices. The polymerization can also be carried out in solution with precipitation of the product, if desired, by standard techniques such as steam-stripping.

The most important variable in the polystyrene constituent is its molecular weight. The vinyl aromatic or plastic polymer should have a number average molecular weight between about 50,000 and 500,000, preferably in the range of 100,000 to 300,000.

The diene-type polymers (B) employed in the discontinuous phase in the blends of this invention are non-crosslinked homopolymers of 1,3-butadiene, or non-crosslinked random copolymers containing at least 60 weight percent 1,3-butadiene, preferably at least 90 weight percent conjugated dienes, 0 to 40 weight percent styrene or alpha-methylstyrene and not more than 10 weight percent of other ethylenically unsaturated compounds copolymerizable therewith. It will be understood that the above percentages are on the basis of the weight of the copolymers. Suitable monomers for copolymerization with butadiene include; for instance, vinyl aromatics such as the various mono- and poly-nuclear chlorinated styrenes, vinyl naphthalene, vinyl carbazole and the like; vinyl ethers such as methyl vinyl ether, ethyl vinyl ether, isopropyl vinyl ether and the like; methyl isopropenyl ketone, isopropenyl acetate and the like; alpha, beta unsaturated acyl compounds such as acrylic acid, methacrylic acid, methyl acrylate, methyl methacrylate, ethyl acrylate, diethyl maleate, maleic anhydride and the like; and conjugated unsaturated compounds such as isoprene, 2,3-dimethyl-1,3-butadiene and the like.

The diene-type polymers employed in the blends of this invention can be prepared by any of the well-known polymerization systems such as bulk or solution polymerization systems.

The conjugated diene or rubber polymer should have a number average molecular weight between 100,000 and several million, preferably in the range of 250,000 to 500,000. It is also important that the conjugated diene or rubber polymer must be sufficiently incompatible with the matrix in which it is to be dispersed that a blend without any block copolymer distinctly shows the glass or second order transition temperature of the rubber polymer.

While some benefit has been derived in the systems of this invention using graded block copolymers in which the weight ratio of total A to B has ranged from 20:80 to 90:10, the desired and claimed weight range is from 45:55 to 60:40. Outside this relatively narrow range the desired balance of properties is not achieved.

The graded ABA block copolymers (C) employed in the blends of this invention are such that the graded A segments are compatible with the styrene-type polymer and the graded B segment is compatible with the diene-type polymer. At the same time each A segment should be incompatible with the diene-type polymer and each B segment should be incompatible with the styrene-type polymer as the term incompatible is used above. Preferably, the monomer used as the major constituents in the preparation of the styrene-type polymer and the monomer used in the preparation of each A segment of the block copolymer are the same. Similarly, the monomer used as the major constituent in the preparation of the diene-type polymer and the monomer used in the preparation of each B segment of the block copolymer are also preferably the same.

Graded ABA block copolymers differ from pure ABA block copolymers of the same molecular weight in that some of the A monomer, generally about 20 weight percent of the total A monomer, is included in the B block while some of the B monomer appears in the A blocks. On the other hand, in the pure ABA block copolymers the A blocks are all of A monomer while the B block is all B monomer. One manifestation of this fact is the difference in glass transition temperatures between pure block copolymers and graded block copolymers of essentially the same molecular weight. For styrene-butadiene-styrene block copolymers the pure block copolymers generally show a glass transition temperature of about −105°C. for the polybutadiene block B and a glass transition temperature of about 105°C. for the polystyrene block A whereas the corresponding graded block copolymers of this invention show a glass transition temperature of about −90°C. ± 5°C. for the graded polybutadiene block. By thermal analysis the glass transition temperature of the styrene blocks in the graded block copolymers of this invention usually cannot be seen, but it is not essential.

In pure block copolymers, the principal or major A blocks should have number average molecular weights between 25 and 50 percent of the calculated number average molecular weight of the continuous polystyrene phase. However, in graded block copolymers because of the styrene monomer which is combined in the principally polybutadiene blocks the calculated polystyrene number average molecular weight of the polystyrene blocks in the graded block copolymer is closer to 30 to 70 percent of the calculated number average molecular weight of the continuous polystyrene phase. Thus, with a continuous polystyrene phase having a number average molecular weight of 120,000, each graded A block in the block copolymer should have a calculated number average molecular weight of from 36,000 to 84,000 and will show principal blocks having actual number average molecular weights in the range of about 30,000 to 60,000. For graded block copolymers having A:B ratios between 45:55 and 60:40 the total calculated number average molecular weights can range from about 120,000 to about 375,000. However, it has been found that the graded block copolymer should have a number average molecular weight in the range of 150,000 to 500,000, preferably about 200,000 to 300,000, in the compositions of this invention.

The initial particle sizes of the graded ABA block copolymers and the diene polymer are not particularly critical in themselves. Of primary concern is the particle size of the discontinuous phase in the blends of this invention. In order to get the optimum balance of properties in the finished blends of this invention with special emphasis on impact resistance, it is necessary that at least 70 percent, preferably 85 percent or more, by weight of the defined and claimed particles in the finished blends of this invention each have a particle diameter in the range of 0.2 to 5 microns. A minor amount, i.e., no more than 30 weight percent, of the particles in any finished blend can be outside the defined range, but the particles having sizes below the defined range do not improve significantly physical properties of the blend as compared to the polystyrene alone, and the particles having sizes above the defined range tend to have an adverse effect on surface texture of the blends when vacuum-formed, for example, although there is some apparent improvement in physical properties of the blend as compared to the polystyrene phase alone.

The preparation of graded block copolymers ABA is well known as shown in U.S. Pat. No. 3,287,333 and is also illustrated in EXAMPLE I below. The preferred solvents for such preparations are hexane and cyclohexane.

It should be noted that processing conditions have a great effect on molecular weights of all components and on particle size of the discontinuous phase. High-shear mixing tends to reduce the particle size of the discontinuous phase. For the purposes of this invention, particle sizes of the dispersed phase, once reduced below the stated minimums, cannot be corrected. The particle sizes of greatest importance apply to the dispersed particles of the final blended product. Particle size was determined optically or by electron microscopy.

The polymer blends of this invention can contain (A) and (B) type polymers as described above in a molar ratio of from about 1:1 up to 100:1 or higher, but the molar ratio preferably ranges from about 2:1 to about 5:1. This is equivalent in a polystyrene-polybutadiene blend to a weight ratio of about 4:1 to about 10:1. The block copolymers is employed in an amount of from about 3 to 25 weight percent of the total blend, preferably about 5 to 15 weight percent. In the butadiene-polystyrene blend employing graded ABA block copolymers it has been found that the total vinyl aromatic, e.g., styrene, content, both as homopolymer and copolymer, should be in the range of 75 to 95 weight percent of the total blend, preferably from about 80 to about 90 weight percent, in order to achieve optimum impact, flexural and heat distortion characteristics.

Of particular interest are the blends in which the monomers employed in all the components are limited to styrene and butadiene. Such blends can be prepared by properly melt mixing under shear stress without a significant decrease in physical properties over similar blends prepared in solution systems.

The blends of this invention can be prepared by any of the methods well known in the act as exemplified by the patent references cited above. Melt mixing under shear stress as in Banbury blenders, mills and/or continuous mixers has proved to be successful for the blends of this invention.

The following examples are illustrated of the best methods and alternative methods of preparing the compositions of this invention and are not intended to limit this invention which is properly delineated in the claims. Unless otherwise stated, quantitative measurements are by weight.

EXAMPLE I

A block copolymer M as employed in this example was a graded ABA block copolymer in which each A represents essentially a polymerized styrene portion and B represents essentially a polymerized butadiene portion, the total polymerized styrene amounting to 60 weight percent of the block copolymer and the total polymerized butadiene amounting to a total of 40 weight percent of the block copolymer. The subject block copolymer was prepared in an agitated n-hexane solution, there being sufficient n-hexane present at all times to give a solution containing about 15 weight percent solids. Styrene monomer and sufficient butadiene to give the desired 60/40 styrene/butadiene weight ratio were dissolved in n-hexane at room temperature and heated to 150°F. A 1 percent solution of n-butyl lithium in n-hexane was added slowly at 150°F. until there was a slight exotherm indicating that all impurities had reacted and would not interfere with the subsequent polymerization. Sufficient low molecular weight dilithio-polyisoprene catalyst was then added, and the mixture was heated at 150°F. for about 4 hours to produce a graded ABA block copolymer having a number average molecular weight of about 225,000 to 250,000 and comprising a central portion rich in polybutadiene and terminal portions rich in polystyrene. The living copolymer was deactivated or killed by the addition of isopropanol until the solution became colorless. An antioxidant (2,5-di-t-butyl-para-cresol) was added as an isopropanol solution of 0.01 gram of the antioxidant per milliliter of isopropanol such that there was about 1 weight percent antioxidant based on the initial weight of the butadiene.

The graded ABA block copolymer solution can be used for solution blending or the hexane (and isopropanol) can be steam-stripped off leaving the graded ABA block copolymer as a fine crumb for solid state mixing.

A block copolymer M in benzene solution at 30°C. was solution blended with a commercial polystyrene having a number average molecular weight of 120,000 and a commercial polybutadiene having a number average molecular weight in the range of 250,000 to 300,000 in amounts to give a blend containing 72.5 weight percent pure polystyrene, 12.5 weight percent block copolymer M and 15 weight percent pure polybutadiene. The block copolymer and polybutadiene formed particles at least 70 weight percent of which had diameters between 0.2 and 5 microns. The total styrene content of the polyblend was 80 weight percent. The polymer blend is best isolated by adding the benzene solution to agitated isopropanol. Precipitation of the polymer takes place. The resulting while polymer blend is then dried in a vacuum oven at 50°C. to a constant weight.

Test specimens of the polymer blend were prepared by placing the polymer blend between two plates coated with polytetra-fluoroethylene and heating to 310°F. for 1 minute to change the polymer blend into a fused disc which was cut into strips and compression molded at 370°F. for 10 minutes at 20,000 psi into test bars 2.5 × 6 × 0.125 inches and 1.125 × 6 × 0.125 inches. Test specimens were cut from the test bars and were used in a number of tests including determination of flexural modulus by ASTM physical test method 2418, determination of notched Izod impact strength, and determination of heat distortion temperature (°C.) when test specimens had deflected 10 mils and 60 mils at an applied load of 264 psi.

The test specimens showed a flexural modulus of 278,000 psi, notched Izod impact strength of 7.54 ft.-lbs./inch notch, 10 mil deflection at 85°C. and 60 mil deflection at 98°C.

By comparison, similarly prepared test specimens of a commercial "high impact" polystyrene and a commercial "high flexural modulus" polystyrene showed flexural moduli of 227,000 and 382,000 psi respectively, notched Izod impact strengths of 1.60 and 1.15 ft.-lbs./inch notch respectively, 10 mil deflection at 79°C. and 75°C. respectively and 60 mil deflection at 88°C. and 84°C. respectively.

EXAMPLE II

A block copolymer M as a dry crumb was mixed in a high-speed Banbury mixer with the commercial polystyrene and commercial polybutadiene employed in Example I for about 4 minutes to a dump temperature of 400°F. The block copolymer and polybutadiene formed particles at least 70 weight percent of which had diameters between 0.2 and 5 microns.

Test specimens of the resulting blend prepared and tested according to the methods described in Example I showed a flexural modulus of 248,000 psi, notched Izod impact strength of 7.80 ft.-lbs./inch notch and 10 mil deflection at 81°C.

EXAMPLE III

A polymer blend was prepared according to the method of Example I using the block copolymer M, the commercial polystyrene and the commercial polybutadiene described in Example I in the proportions shown below. The block copolymer and polybutadiene formed particles at least 70 weight percent of which had diameters between 0.2 and 5 microns. Test specimens of this blend prepared and tested according to the methods described in Example I showed the properties shown below.

TABLE

| | |
|---|---:|
| Weight percent of | |
| Polystyrene | 77.5 |
| Polybutadiene | 10.0 |
| Block Copolymer M | 12.5 |
| Flexural Modulus (psi) | 294,000 |
| Notched Izod Impact (ft.-lbs./inch notch) | 6.29 |
| Heat distortion Temp. (°C.) | |
| 10 mil | 80 |
| 60 mil | 92 |

A similar blend prepared as described in Example II and similarly tested showed a flexural modulus of 306,000 psi, notched Izod impact strength of 4.36 ft.-lbs./inch notch and 10 mil deflection at 85°C.

EXAMPLE IV

A polymer blend of 74.5 parts of the polystyrene of Example I, 16.5 parts of the polybutadiene of Example I and 9 parts of a block copolymer M was prepared by mill mixing the components for 10 minutes at 325°F. in the absence of solvent. The block copolymer and polybutadiene formed particles at least 70 weight percent of which had diameters between 0.2 and 5 microns. Test specimens of this polymer blend prepared and tested according to the methods described in Example I showed a flexural modulus of 260,000 psi and a notched Izod impact strength of 5.80 ft.-lbs./inch notch. Heat distortion values were: 77°C. (10 mil); 95°C. (60 mil).

EXAMPLE V

A polymer blend of 72.5 weight percent of the commercial polystyrene employed in Example I, 15 weight percent of the commercial polybutadiene employed in Example I and 12.5 weight percent of a block copolymer M was prepared by mill mixing the components for 10 minutes at 325°F. in the absence of solvent. Test specimens of this polymer blend prepared and tested according to the methods described in Example I showed a flexural modulus of 268,000 psi, a notched Izod impact strength of 5.85 ft.-lbs./inch notch, a 10 mil deflection at 88°C. and a 60 mil deflection at 96°C.

Similar good results have been obtained from polymer blend prepared by extrusion and/or injection molding.

EXAMPLE VI

A block copolymer N was prepared in accordance with the procedure described in Example I but having equal amounts of styrene and butadiene.

A blend of 18.8 parts of a block copolymer N, 118.1 parts of the commercial polystyrene employed in Example I, 13.1 parts of a commercial polybutadiene similar to that employed in Example I and 0.3 part of a standard antioxidant was prepared in accordance with the method described in Example II. The block copolymer and polybutadiene formed particles at least 70 weight percent of which had diameters between 0.2 and 5 microns.

Test specimens prepared as described in Example I showed a flexural modulus of 282,000 psi, notched Izod impact strength of 5.5 ft.-lbs./inch notch, 10 mil deflection at 81°C. and 60 mil deflection at 91°C.

Compounds of this invention are of particular interest because of their excellent properties at low temperatures as well as at room temperatures. For example, a polymer blend of this invention having a total styrene content of 80 weight percent and a notched Izod impact strength of 6.40 ft.-lbs./inch notch at room temperature had notched Izod impact strengths of 4.80 and 3.06 ft.-lbs./inch notch at −20°F. and −40°F. respectively. Thus, at −40°F. this polymer blend apparently had better impact strength than other commercially available high impact polystyrene at the same temperature or even at room temperature.

For the purposes of this invention, the discontinuous phase is dispersed in the continuous phase or matrix as particles at least 70 weight percent of which have particle diameters in the range of 0.2 to 5 microns as measured by the "Zeiss Particle Size Analyzer". This analyzer and its use is described in "New Techniques of Particle Analysis" by D. W. Montgomery in *Rubber Age*, February 1964.

What is claimed is:

1. A blend consisting essentially of
   A. a matrix of polymers prepared from at least 90 weight percent vinyl aryl monomers, any other monomers being other copolymerized ethylenically unsaturated monomers, said polymers having a number average molecular weight of from about 50,000 to 500,000;
   B. non-crosslinked conjugated aliphatic diene polymers prepared from at least 60 weight percent 1,3-butadiene, 0 to 40 weight percent of copolymerized monovinyl-substituted monocyclic aryl compounds and 0 to 10 weight percent of other copolymerized ethylenically unsaturated monomers, the number average molecular weight of said polymers being at least 100,000; and
   C. graded block copolymers of the type ABA in which each A segment is a polymer segment compatible with and essentially as defined above for component (A) and each B segment is a polymer segment compatible with and essentially as defined above for component (B), the weight ratio of total A to B ranging from 45:55 to 60:40, the number average molecular weight of said block copolymers being from 150,000 to 500,000, said graded block copolymers having a principal glass transition temperature of about −90°C. ± 5°C.;

components (B) and (C) being dispersed as a discontinuous phase in said component (A) as particles of which at least 70 weight percent have diameters in the range of 0.2 to 5 microns, components (A) and (B) being present in a molar ratio of at least about 1:1, and component (C) being present in the blend in an amount of from about 3 to 25 weight percent of the total blend, the total monovinyl monocyclic aryl units in components (A), (B) and (C) being from 75 to 95 weight percent of the total units in said components.

2. A blend in accordance with claim 1 wherein the polymers in component (A) comprise at least 35 weight percent polymerized styrene and the polymers in component (B) comprise at least 90 weight percent polymerized conjugated dienes.

3. A blend in accordance with claim 2 wherein the polymers in component (A) have a number average molecular weight of 100,000 to 300,000, the polymers in component (B) have a number average molecular weight of 250,000 to 500,000, and the copolymers in component (C) have a number average molecular weight of 200,000 to 300,000.

4. A blend in accordance with claim 3 wherein the number average molecular weight of the A blocks in the copolymers in component (C) is between 25 and 50 percent of the calculated number average molecular weight of the polymers in component (A).

5. A blend in accordance with claim 4 wherein the polymers in component (A) are polymerized monovinyl-substituted monocyclic aryl compounds and the polymers in component (B) are polymerized conjugated dienes of four to five carbon atoms.

6. A blend in accordance with claim 5 wherein the graded block copolymers in component (C) are copolymers of styrene and butadiene.

7. A blend in accordance with claim 6 wherein component (A) consists essentially of polystyrene, component (B) consists essentially of polybutadiene and components (A) and (B) are present in a molar ratio of from about 2:1 to about 5:1.

8. A blend in accordance with claim 7 wherein component (C) is present in an amount equal to from 5 to 15 percent of the total blend and components (A) and (B) are present in such proportion that the total polymerized styrene content is from 80 to 90 weight percent of the total blend.

9. A method of making resins having excellent impact strengths, flexural moduli and heat distortion characteristics, particularly at low temperatures, comprising blending a mixture consisting essentially of A. a matrix of polymers prepared from at least 90 weight percent vinyl aryl monomers, any other copolymerized monomers being other ethylenically unsaturated monomers, said polymers having a number average molecular weight of from about 50,000 to 500,000;

B. non-crosslinked conjugated aliphatic diene polymers prepared from at least 60 weight percent conjugated dienes, 0 to 40 weight percent of copolymerized monovinyl-substituted monocyclic aryl compounds and 0 to 10 weight percent of other copolymerized ethylenically unsaturated monomers, the number average molecular weight of said polymers being at least 100,000; and C. graded block copolymers of the type ABA in which each A segment is a polymer segment compatible with and essentially as defined above for component (A) and each B segment is a polymer segment compatible with and essentially as defined above for component (B), the weight ratio of total A to B ranging from 45:55 to 60:40, the number average molecular weight of said block copolymers being from 150,000 to 500,000, said graded block copolymers having a principal glass transition temperature about −90°C. ± 5°C.;

components (B) and (C) being dispersed as a discontinuous phase in said component (A) as particles of which at least 70 weight percent have diameters in the range of 0.2 to 5 microns, components (A) and (B) being present in a molar ratio of at least about 1:1, and component (C) being present in the blend in an amount of from about 3 to 25 weight percent of the total blend, the total monovinyl monocyclic aryl units in components (A), (B) and (C) being from 75 to 95 weight percent of the total units in said components.

10. A method in accordance with claim 9 wherein the mixture is blended in a mutual solvent and precipitated from said solvent.

11. A method in accordance with claim 9 wherein the mixture is blended by heating at a temperature of at least 310°F.

12. A method in accordance with claim 9 wherein the polymers in component (A) comprise at least 35 weight percent polymerized styrene and the polymers in component (B) comprise at least 90 weight percent polymerized conjugated dienes.

13. A method in accordance with claim 12 wherein the polymers in component (A) have a number average molecular weight of 100,000 to 300,000, the polymers in component (B) have a number average molecular weight of 250,000 to 500,000 and the copolymers in component (C) have a number average molecular weight of 200,000 to 300,000.

14. A method in accordance with claim 13 wherein the number average molecular weight of the A blocks in the copolymers in component (C) is between 25 and 50 percent of the calculated number average molecular weight of the polymers in component (A).

15. A method in accordance with claim 14 wherein the polymers in component (A) are polymerized monovinyl-substituted monocyclic aryl compounds and the polymers in component (B) are polymerized conjugated dienes of four to five carbon atoms.

16. A method in accordance with claim 15 wherein the graded block copolymers in component (C) are copolymers of styrene and butadiene.

17. A method in accordance with claim 16 wherein component (A) consists essentially of polystyrene, component (B) consists essentially of polybutadiene and components (A) and (B) are present in a molar ratio of from about 2:1 to about 5:1.

18. A method in accordance with claim 17 wherein component (C) is present in an amount equal to from 5 to 15 percent of the total blend and components (A) and (B) are present in such proportion that the total polymerized styrene content is from 80 to 90 weight percent of the total blend.

19. A blend in accordance with claim 7 wherein components (B) and (C) are dispersed as a discontinuous phase in said component (A) as particles of which at least 85 weight percent have diameters in the range of 0.2 to 5 microns.

20. A method in accordance with claim 17 wherein components (B) and (C) are dispersed as a discontinuous phase in said components (A) as particles of which at least 85 weight percent have diameters in the range of 0.2 to 5 microns.

* * * * *